United States Patent [19]

Love

[11] 4,015,858
[45] Apr. 5, 1977

[54] OVERWIDTH DEVICE FOR FLAT BED TRUCK OR TRAILER

[76] Inventor: Richard R. Love, Box 468, Buhl, Idaho 83316

[22] Filed: Mar. 23, 1976

[21] Appl. No.: 669,612

[52] U.S. Cl. .......................... 280/656; 280/106 T; 296/28 F
[51] Int. Cl.² ..................... B62D 21/00; B60P 1/00
[58] Field of Search ............ 280/106 T, 28 R, 106, 280/638, 641, 656; 296/26, 7, 8, 13, 14, 28 R, 28 F

[56] References Cited

UNITED STATES PATENTS

| | | | |
|---|---|---|---|
| 1,332,843 | 3/1920 | Johnson | 296/13 |
| 2,717,802 | 9/1955 | Martin | 280/106 T |
| 3,534,977 | 10/1970 | Wessel | 280/106 R |

*Primary Examiner*—Philip Goodman
*Attorney, Agent, or Firm*—Kemon, Palmer & Estabrook

[57] ABSTRACT

A flat bed truck or trailer is provided with extensible side plate members or segments to increase the area of the truck or trailer bed. The side members are capable of being retracted when not in use so as to lie substantially within the area of the truck or trailer bed. When in their extended position, the side members are provided with suitable supports to lend strength and rigidity thereto. The increased bed area enables farm machines, such as tractors, combines, windrowers and the like as well as off highway earth working machinery to be readily supported thereon while being transported from one area to another.

9 Claims, 6 Drawing Figures

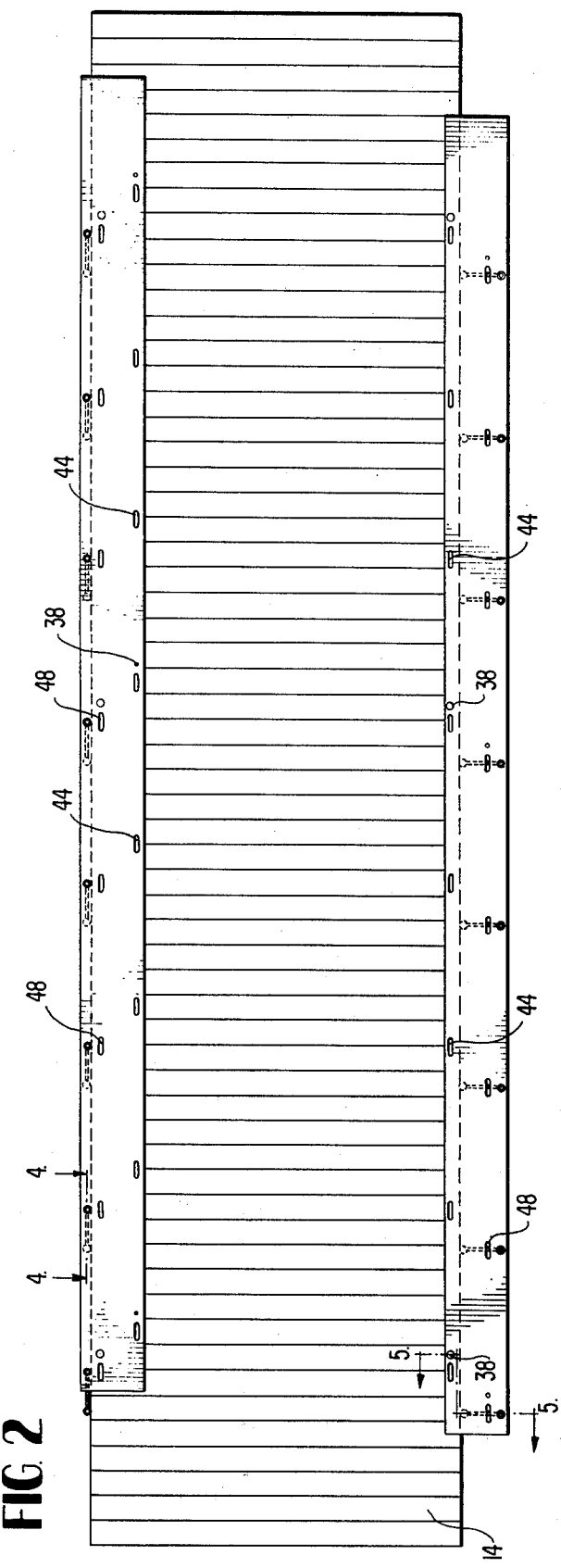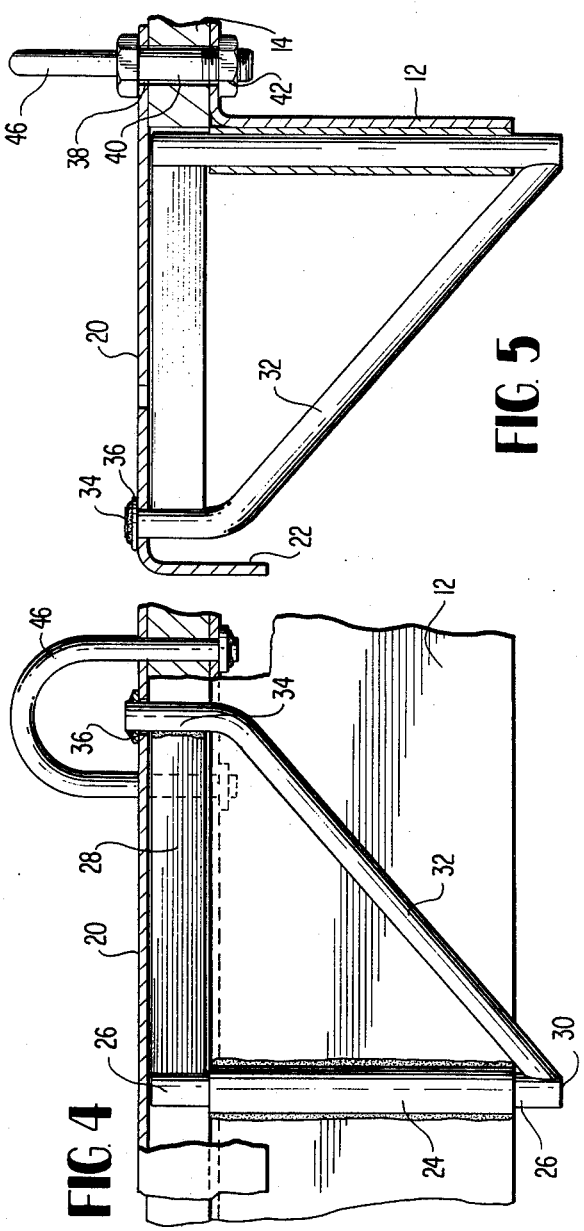

OVERWIDTH DEVICE FOR FLAT BED TRUCK OR TRAILER

BACKGROUND OF THE INVENTION

The present invention relates to a wheeled land vehicle having a bed or platform that is provided with extensible and retractable side plate or extension members.

In vehicles employed to transport heavy farm machines of off-highway earth working machinery, the width of such vehicles is controlled by state highway laws. In order to provide stability, as well as safety, in handling such high, top-heavy loads, the vehicle wheels must be spaced apart as far as possible, whether it be a flat bed truck or trailer. As a result of spacing the wheels as widely apart as possible, the edges of the truck or trailer bed must terminate in almost the same vertical plane as that of the outer surface of the wheels or tires.

The devices that have been used heretofore to increase the width of a truck bed, have consisted of plates, segments or extensions that have been hinged or pivotally connected to the side edges of the truck or trailer bed. When the side plates are not being used, they are folded downward and they must not increase the width of the truck or trailer bed more than that permitted by law. Thus by spacing the truck or trailer wheels as much as possible to provide for stability, there is very little margin for bed overhang to support the depending side plates or extension members and still maintain them within the 96 inches state highway law limit. When the side plates are moved from a depending to a horizontal load supporting position, the inner edge of the side plates may abut the outer edge of the truck bed and lie in the same plane as the truck bed or said inner edge of the side plates or extension members may overlie the outer edge of the truck or trailer bed. The latter arrangement would be the most desirable from the standpoint of providing support for the side plates but the amount of overlap is relatively small. This is due to the fact that the wheels supporting the truck or trailer bed are spaced almost the maximum distance allowed by state highway laws.

Thus the width of the truck or trailer bed must not exceed the state highway law and said bed width must include the depending side plates which in turn must clear the tires of the vehicle wheels. In view of this requirement, the side plates or extension members have a restricted arc that they pass through when moving from the depending position to the horizontal load supporting position. Such an arrangement does not produce a very strong and stable extension for the truck or trailer bed when it becomes necessary to support a wheel of a tractor or combine that very well might weigh 4 or 5 tons.

SUMMARY OF THE INVENTION

The present invention is directed to a flat bed truck or trailer that is provided with extensible and retractable side plates or extension members. The side plates overlie the bed of the truck or trailer and when extended or retracted move in a plane that is in spaced parallel relation to the plane of the truck or trailer bed. Such an arrangement enables the inner edge of the side plates or extension members to overlie a greater area of the truck or trailer bed thereby providing for a much stronger side plate or extension members and enabling same to readily support a wheel of a piece of farm machinery or off-highway earth working machinery.

The outer edge portion of the side plates or extension members are provided with angled supports or braces that are carried by the truck or trailer bed and a swinging movement of said supports or braces moves the side plates or extension members over the bed surface as said plates or extension members are being advanced or retracted. The positioning of the side plates or extension members in a plane parallel to the plane of the truck or trailer bed and providing said plates or extension members with pivotally mounted supports permits the inner edge portion of the plates or extension members to overlie a greater portion of the truck or trailer bed when said plates or extension members are in their extended position.

The foregoing arrangement provides for a greater overlap between the inner edge portion of the side plates or extension members and the bed of the truck or trailer than is possible with prior devices wherein the side members are pivotally connected to the truck or trailer bed and move from a depending or hanging position to a horizontal or load supporting position. The overlap of the inner edge portion of the side plates or extension members with a truck or trailer bed of the present application provides a strong side plate or extension member when in its extended position and one which is capable of supporting a heavy load.

BRIEF DESCRIPTION OF THE DRAWING

FIG. 2 is a plan view of a flat bed trailer with side plates of the present invention, the side plate members on one side of the bed being in a retracted position and on the other side in an extended position;

FIG. 3 is a detailed view of a fragmentary portion of a side plate or extension member of the present invention;

FIG. 4 is a sectional view of a portion of a side plate or extension member and the trailer bed, the view being taken on the line 4—4 of FIG. 2;

FIG. 5 is a section view of a portion of a side plate or extension member, the view being taken on the line 5—5 of FIG. 2.

DESCRIPTION OF THE PREFERRED EMBODIMENT

Figure 1:
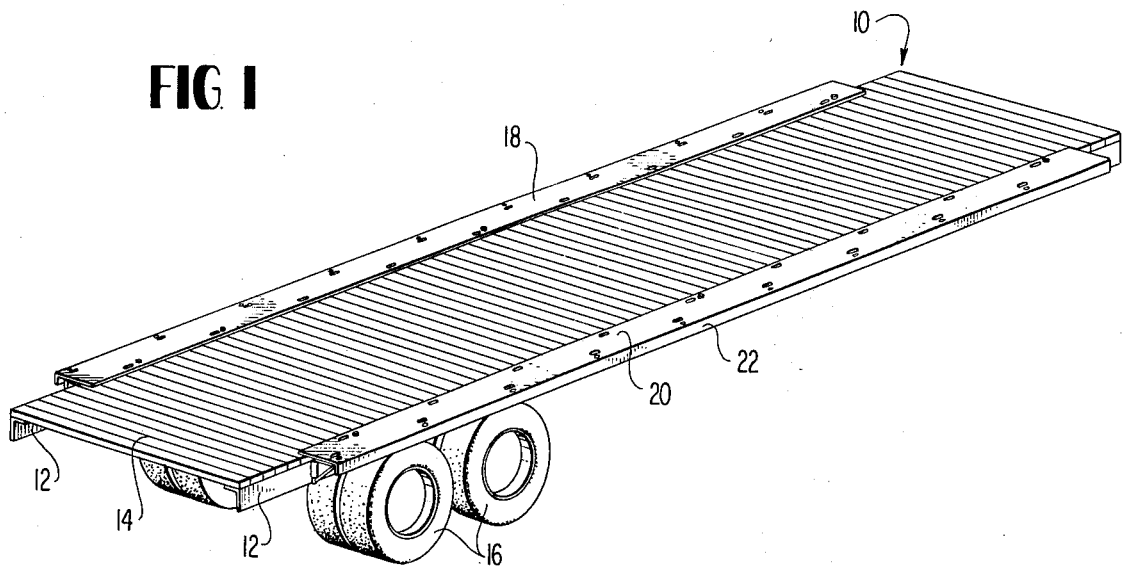
FIG. 1 is a perspective view of a flat bed trailer with side plates or extension members of the present invention in their extended position.

Referring to the drawings, there is shown in FIG. 1 a conventional flat bed trailer 10 that includes the usual channel shaped side frame members 12 that are adapted to support the usual decking 14. The trailer bed 10 is supported and carried by a plurality of wheels 16 in the usual and customary manner.

The upper surface of the trailer bed 10 is provided with a pair of longitudinally extending side plate or extension members 18 which consist of elongated flat members or segments 20 that terminate at their outer edges in down-turned flanges 22. Thus the side plate or extension members 18 are of angled configuration with the larger portion of the angle overlying the bed 14 of the truck or trailer and said side plate or extension members may be formed from suitable metal, such as iron.

Figure 6:
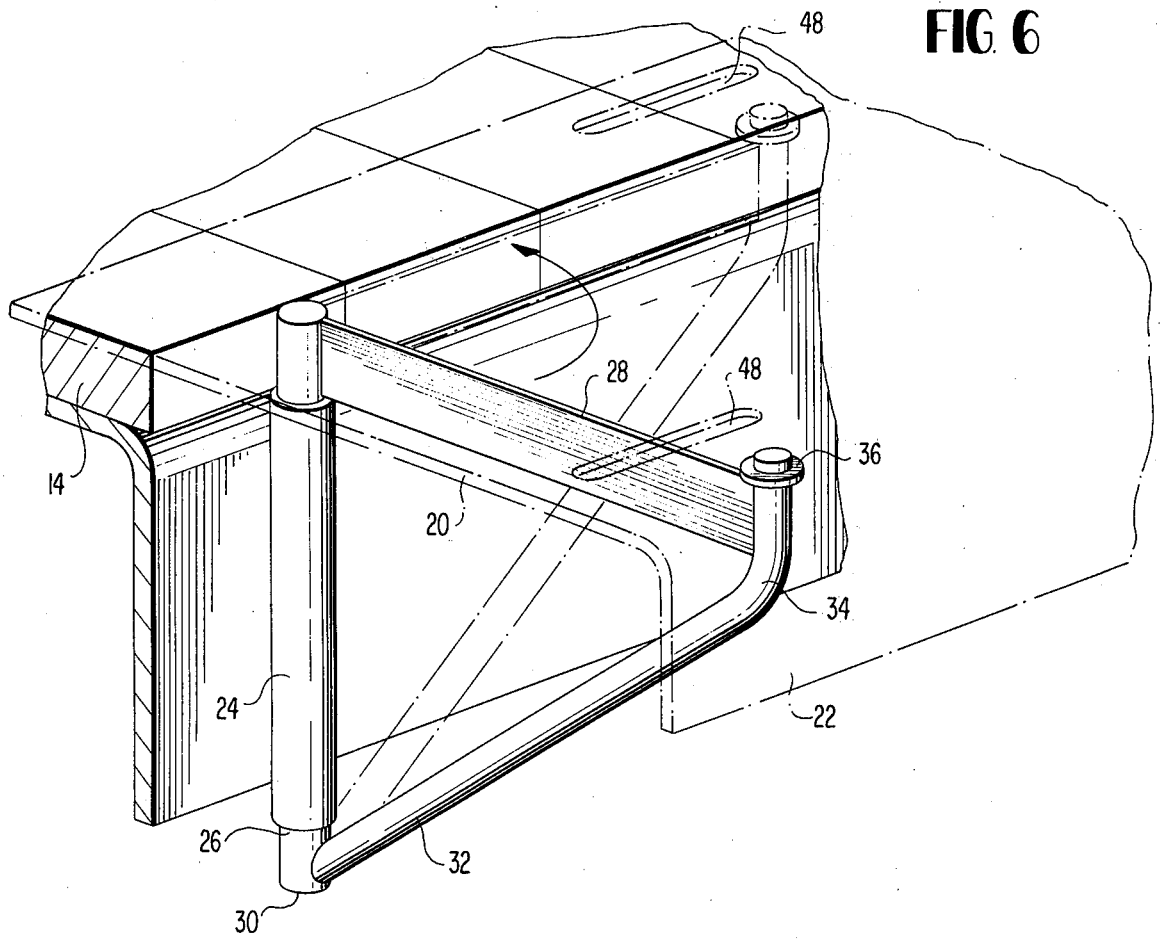
FIG. 6 is a detailed view of a fragmentary portion of a side plate or extension member showing the pivotally mounted support therefor.

The frame members 12 of the bed 10 have secured thereto by suitable means, such as welding, tubular socket-like elements or members 24, FIGS. 4 through 6. The socket-like elements 24 are of a height or length commensurate with that of the frame members 12 so that the upper end of the socket member terminates at approximately the lower edge of the decking 14 where it is supported on the frame members 12. The socket-like elements 24 are adapted to receive pins 26 that are of a length or height greater than that of the socket-like elements or members 24 with the portion of the pin that projects above the upper edge of the socket-like element 24 having one end of a web or brace member 28 secured thereto by any suitable means, such as welding. The lower end portion 30 of the pin 26 extends beyond the lower edge of the tubular socket-like element 24 and to said end portions 30 there is secured, by any suitable means, such as welding the lower end of an angularly disposed brace member 32. The upper end portion 34 of the angularly disposed brace member 32 is bent so as to lie within a plane that is in spaced parallel relation to the plane in which the pin 26 lies and said end portion 34 is secured, by welding or the like, to the outer end of the web or brace member 28. The upper end of the end portion 34 of the angularly disposed brace member 32 extends through a suitable aperture that is provided in the member 20 just inboard of the down turn flange 22. A suitable collar or disc 36 is secured to the end of the brace member 32 superjacent the member 20 to insure the retention and positioning of the end portion 34 of the brace member 32 with respect to the side plate or extension members.

The upper edge of the web or brace member 28 lies in the same plane as the upper end of the pin 26 for supporting the plate-like segment 20 of the side plate or extension members when same are in their extended position, as shown in FIGS. 5 and 6. The segments 20 of the side plate or extension members 18 are free to move with respect to the upper edge of the brace member 28 and the upper end of the pin 26 in order to permit the expansion or retraction of the side plate or extension members with respect to the bed or decking 14 of the trailer 10. The connection of the segment 20 to the upper end of the angular brace 32 causes said brace to move the side plate or extension members from their retracted position to their extended position when the brace member 32 is moved from the broken line position of FIG. 6 to the full line position. This movement causes the side plate or extension members to be advanced from the retracted position to the extended position.

The innermost edge portion of the elongated flat member 20 of the side plate or extension members is provided with a plurality of spaced apertures 38, FIG. 2, which are adapted to overlie corresponding apertures in the outer edge portions of the decking 14 and the side frame members 12 for the reception of suitable bolts 40, FIG. 5. The bolts 40 have suitable nuts 42 threaded on the lower ends thereof for securely anchoring the plate-like segments 20 to the bed of the trailer when said side plate or extension members are in their extended position. The inner edge portions of the members 20 are also provided with a plurality of spaced slots 44 that are arranged in alignment with the apertures 38 and which slots are adapted to permit the passage of the upper arcuate shaped portions of tiedown loops 46 that are retractably carried by the decking 14 of the trailer bed. The members 20 of the side plate or extension members 18 are also provided, adjacent their outer edge portions, with a plurality of spaced slots 48 which are adapted to receive suitable tiedown loops, not shown, for anchoring or securing suitable machinery upon the bed of the truck or trailer.

In the use of the side plate or extension member of the present invention, the downturned flanges 22 of the segments 20 can be grasped by hand and manually pulled outwardly away from the bed of the truck or trailer. This movement will cause the segments 20 to slide over the bed of the truck or trailer 10 in an arcuate-like path of travel as the pins 26 rotate in the tubular socket-like elements 24. In this manner the brace members 32 move from a position wherein they are substantially parallel to the frame members 12 to a position wherein said brace members are in planes normal to the plane of the side frame members 12. In other words upon grasping the downturned flanges 22 of the segments 20 and pulling said flanges outwardly with respect to the bed of the trailer, the brace members 32 along with the web 28 will pivot in the socket-like elements 24 and move from the broken line position to the full line position of FIG. 6.

This movement will then cause the side board members to be extended with respect to the bed of the truck and upon reaching this position the bolts 40 may then be inserted through the apertures provided in the segments 20 and in the decking 14 so that the nuts 42 may be secured to the lower ends of the bolts to anchor or secure the side plate or extension members with respect to the bed of the trailer. The degree of overlap of the inner edge portion of the segments 20 with respect to the outer edges of the decking 14 of the bed of the trailer 10 can be determined by the size of the segments 20 or it can be determined by the length and angle of the brace members 32 carried by the lower end of the pins 26. This overlap of the inner edge of the side plate or extension members 18 with respect to the bed of the trailer provides for greater strength between the side plate or extension members and the truck or trailer bed and thus makes for a more rigid structure.

This arrangement or overlap enables the truck or trailer bed with the side plate members extended to be readily capable of supporting the weight of farm machinery or off-highway excavating machinery while same is being transferred from one area to another. The degree of overlap between the bed of the trailer and the inner edge portions of the segments 20 of the side plate or extension member 18 provides for a more rigid and stable area for supporting said farm machinery during transportation and yet the ease and facility with which said side plate or extension members 18 may be retracted enables the truck bed or trailer to meet the width requirements of the state highway laws.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A truck or trailer vehicle having a flat bed including a pair of horizontally disposed frame members arranged in spaced parallel relation to one another for supporting suitable decking in superimposed relation thereto, side plate members slidably positioned upon said decking and overlying each of said frame members, means carried by said frame members and engagable with said side plate members for slidably advancing the greater portion of said side plate members over and beyond said frame members to increase the area of said flat bed.

2. A truck or trailer vehicle as set forth in claim 1 wherein said side plate members comprise angled members having segment overlying said decking that terminates in a downturned flange arranged in space parallel relation to said frame members.

3. A truck or trailer vehicle as set forth in claim 1 wherein said means includes brace members pivotally carried by said frame members and engagable with said side plate members for advancing and retracting said plate members in a sliding path over said decking.

4. A truck or trailer as set forth in claim 1 wherein said frame members have socket-like elements secured thereto for rotatably supporting brace members connected to said side plate members.

5. A truck or trailer vehicle as set forth in claim 4 wherein said socket like elements have pins positioned therein with an angled brace member connected to the lower end of said pin with a web member connected to the upper end of said pin and said brace member for supporting said side plate members.

6. A truck or trailer vehicle as set forth in claim 2 wherein the segments have their inner edges overlying said decking when said side plate members are advanced outwardly of said frame members.

7. A truck or trailer vehicle as set forth in claim 2 wherein pins are rotatably supported on said frame members and brace members are connected to the lower ends of said pins and said segment with a web connected to said pin and brace members for supporting said segment.

8. A truck or trailer vehicle as set forth in claim 2 wherein the inner edge portion of said segment is provided with spaced apertures that coincide with openings in said decking for receiving fastening members to secure said segment to said decking when said side plate members having been extended with respect to said frame members.

9. A truck or trailer vehicle as set forth in claim 2 wherein said segment is provided with spaced openings to received tiedown loops therethrough which loops are carried by said decking.

* * * * *